US009667449B1

(12) United States Patent
Lu (10) Patent No.: US 9,667,449 B1
(45) Date of Patent: May 30, 2017

(54) CHANNEL ESTIMATOR, DEMODULATOR AND METHOD FOR CHANNEL ESTIMATION

(71) Applicant: Montage Technology (Shanghai) Co., Ltd., Shanghai (CN)

(72) Inventor: Zhen Lu, Shanghai (CN)

(73) Assignee: MONTAGE TECHNOLOGY (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 14/975,874

(22) Filed: Dec. 21, 2015

(30) Foreign Application Priority Data

Dec. 4, 2015 (CN) .......................... 2015 1 0887422

(51) Int. Cl.
H04L 25/03 (2006.01)
H04L 25/02 (2006.01)
H04L 27/26 (2006.01)

(52) U.S. Cl.
CPC ........ *H04L 25/0226* (2013.01); *H04L 27/265* (2013.01); *H04L 27/2613* (2013.01)

(58) Field of Classification Search
CPC H04L 25/0226; H04L 27/265; H04L 27/2613
USPC ........................................ 375/260, 346, 229
See application file for complete search history.

(56) References Cited

U.S. PATENT DOCUMENTS

| 6,314,147 B1* | 11/2001 | Liang | H04B 7/0854 |
| | | | 375/346 |
| 2003/0174767 A1* | 9/2003 | Fujii | H04B 7/005 |
| | | | 375/229 |
| 2008/0232439 A1* | 9/2008 | Chen | H04L 25/03038 |
| | | | 375/148 |
| 2014/0010267 A1* | 1/2014 | Jacob | H04L 1/20 |
| | | | 375/219 |

OTHER PUBLICATIONS

Bowei Song, Lin Gui, Yunfeng Guan and Wenjun Zhang, on Channel Estimation and Equalization in TDS-OFDM based Terrestrial HDTV Broadcasting System, Consumer Electronics, IEEE Transactions vol. 51 Issue: 3, Aug. 2005.

(Continued)

*Primary Examiner* — Daniel Washburn
*Assistant Examiner* — Fitwi Hailegiorgis
(74) *Attorney, Agent, or Firm* — Oliff PLC (57) ABSTRACT

A channel estimator, comprises: a receiver receives a first time-domain training sequence; a first convolution circuit generates an estimated value for the first time-domain training sequence by convoluting a second time-domain training sequence with a current channel estimation value; a first subtractor generates an error by subtracting the estimated value for the first time-domain training sequence from the value of the first time-domain training sequence; an updating circuit generates an updated channel estimation value by updating the current channel estimation value with the error; the receiver iteratively receives a next symbol of the first time-domain training sequence, the first convolution circuit, the subtractor and the updating circuit repeat their operation (Continued)

until completion of receipt of a last symbol of the first time-domain training sequence. The updating circuit outputs the current updated channel estimation value upon completion of receipt of a last first time-domain training sequence.

14 Claims, 8 Drawing Sheets

(56) References Cited

OTHER PUBLICATIONS

Weigiang Liang, Wenjun Zhang, Dazhi He, Yunfeng Guan, Yao Wang, Jun Sun, Digital Terrestrial Television Broadcasting in China, IEEE MultiMedia, vol. 14, No. 3, pape 92-97, Jul.-Sep. 2007.

Zhixin Yang, Jun Wang, Meng Han, Changyong Pan, Lin Yang and Zhouan Han, Channel Estimation of DMB-T, Conference Communications, Circuits and Systems and West Sino Expositions, IEEE 2002 International Conference on, vol. 2 p. 1069-1072, 2002.

Framing Structure, Channel Coding and Modulation for Digital Television Terrestrial Broadcasting System GB 20600-2006, p. 10-15, Aug. 18, 2006.

\* cited by examiner

FIG. 3B reconstructed interference signal

CHANNEL ESTIMATOR, DEMODULATOR AND METHOD FOR CHANNEL ESTIMATION

CROSS REFERENCE TO RELATED APPLICATION

This application claims priority to Chinese application No. 201510887422.X entitled "Channel Estimator, Demodulator and Method for channel estimation," filed on Dec. 4, 2015 by Montage Technology (Shanghai) Co., Ltd., which is incorporated herein by reference.

TECHNICAL FIELD

The present invention relates to channel estimation, and more particularly, but not limited to a channel estimator, a demodulator and a method for channel estimation.

BACKGROUND

Performance of channel estimation determines the performance of a signal demodulator. Current Digital Terrestrial Multimedia Broadcast (DTMB) protocol defines three frame structures for channel estimation. Conventional channel estimation in DTMB system uses the auto-correlation property of pseudo-random noise code (PN) sequence in the frame header. However, due to 1) data interference caused by multipath channel, 2) non-ideal auto-correlation property of PN sequence in some frame structures, and/or 3) copied PN that may cause mirrored path in channel estimation when the length of channel estimation is longer than PN length, which may require different channel estimation methods for different time delay paths, the performance of conventional channel estimation method in DTMB system is undesirable. Therefore, it is desirable to design a demodulator that may be accurate and applicable to different frame structures.

SUMMARY

An embodiment of the invention discloses a channel estimator, which comprises a receiver, configured to receive a first time-domain training sequence; a first convolution circuit, configured to generate an estimated value for the first time-domain training sequence by convoluting a second time-domain training sequence with a current channel estimation value, wherein the second time-domain training sequence represents a time-domain training sequence generated by the receiver; a first subtractor coupled to both the receiver and the first convolution circuit, and configured to generate an error by subtracting the estimated value for the first time-domain training sequence from a value of the first time-domain training sequence; an updating circuit coupled to both the subtractor and the first convolution circuit and configured to generate an updated channel estimation value by updating the current channel estimation value with the error, and sending the updated channel estimation value to the first convolution circuit; and the receiver iteratively receives a next symbol of the first time-domain training sequence, the first convolution circuit, the subtractor and the updating circuit repeat their operation using the updated channel estimation value until completion of receipt of a last symbol of first time-domain training sequence, and the updating circuit is configured to output the current updated channel estimation value as a channel estimation result upon receipt of a last symbol of the first time-domain training sequence.

Another embodiment of the invention discloses a demodulator comprising the channel estimator discussed above.

Another embodiment of the invention discloses a method of channel estimation, which comprises: receiving, at a receiver, a first time-domain training sequence; generating an estimated value for the first time-domain training sequence by convoluting a second time-domain training sequence with a current channel estimation value, wherein the second time-domain training sequence represents a time-domain training sequence generated by the receiver; generating an error by subtracting the estimated value for the first time-domain training sequence from a value of the first time-domain training sequence; generating an updated channel estimation value by updating the current channel estimation value with the error; and iteratively receiving a next symbol of the first time-domain training sequence, generating an estimated value for an updated first time-domain training sequence, generating an updated error, and generating an update of the updated channel estimation value, until completion of receipt of a last symbol of the first time-domain training sequence, and outputting the current updated channel estimation value as a channel estimation result upon completion of receipt of a last symbol of the first time-domain training sequence.

DESCRIPTION OF THE DRAWINGS

The present invention is illustrated in an exemplary manner by the accompanying drawings. The drawings should be understood as exemplary rather than limiting, as the scope of the invention is defined by the claims. In the drawings, the identical reference signs represent the same elements.

DETAILED DESCRIPTION

Various aspects and examples of the invention will now be described. The following description provides specific details for a thorough understanding and enabling description of these examples. Those skilled in the art will understand, however, that the invention may be practiced without many of these details. Additionally, some well-known structures or functions may not be shown or described in detail, so as to avoid unnecessarily obscuring the relevant description.

Figure 1:
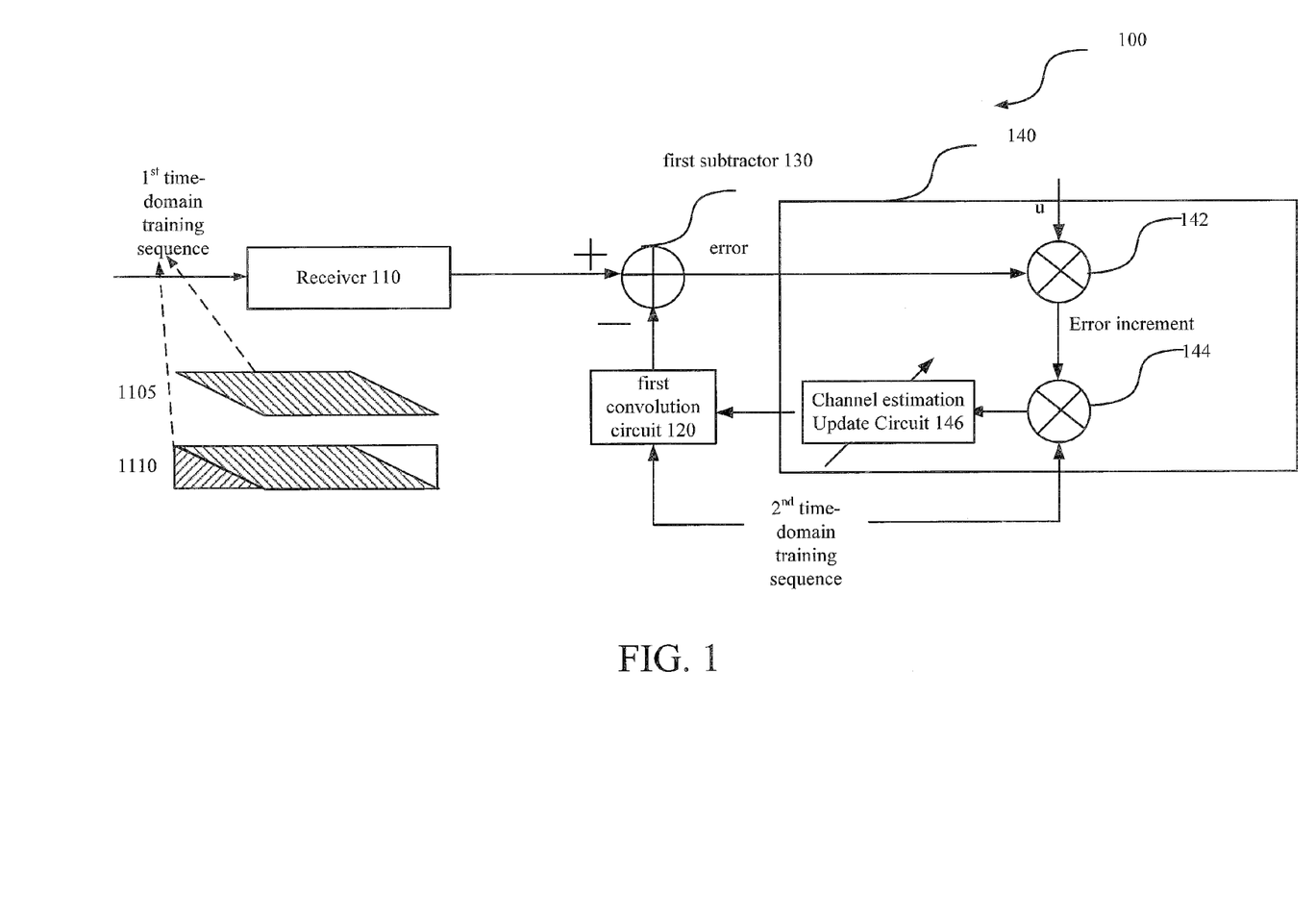
FIG. 1 is a diagram illustrating a channel convergence circuit 100 according to an embodiment of the invention.

FIG. 1 is a diagram illustrating a channel convergence circuit according to an embodiment of the invention. A channel estimator comprises the channel convergence circuit 100, as will be discussed in further details with respect to FIG. 4. The channel convergence circuit 100 comprises a receiver 110, a first convolution circuit 120, a first subtractor 130, and an updating circuit 140. The receiver 110 receives a symbol of a first time-domain training sequence. The first time-domain sequence may be the sequence 1105 shown in FIG. 1, or the sequence 1110 also shown in FIG. 1. The sequence 1105 is the time-domain sequence from which the data interference has been cancelled. The sequence 1105 includes one part represented with slashes (in a parallelogram shape), which is the sequence from which interference has been cancelled. The sequence 1100 is the time-domain sequence which includes the data interference. The sequence 1110 includes three parts, a backslash part (in a triangle shape), a slash part (in a parallelogram shape) and a blank part. Unlike sequence 1105, the sequence 1110 includes interference. Both sequence 1105 and the sequence 1110 will be discussed in detail with respect to following FIG. 2. For example, time-domain training sequence comprises pseudo-random noise code (PN) sequence for DTMB system.

The first convolution circuit 120 generates an estimated value for the first time-domain training sequence by convoluting a second time-domain training sequence with a current channel estimation value. The second time-domain training sequence represents a time-domain training sequence generated by the receiver 110. The second time-domain training sequence is a locally generated time-domain sequence. The second time-domain training sequence may be previously generated and stored in the receiver 110. Alternatively, the second time-domain training sequence may be generated in real-time by a shifting register, which requires fewer hardware resources, such as memories.

The first subtractor 130 is coupled to both the receiver 110 and the first convolution circuit 120. The first subtractor 130 generates an error by subtracting the estimated value for the first time-domain training sequence generated by the first convolution circuit 120 from the value of the first time-domain training sequence.

The updating circuit 140 is coupled to both the first subtractor 130 and the first convolution circuit 120. The updating circuit 140 generates an updated channel estimation value by updating the current channel estimation value with the error, and sending the updated channel estimation value to the first convolution circuit 120.

As shown in FIG. 1, the updating circuit 140 further comprises two multipliers 142 and 144, and a channel estimation update circuit 146. The first multiplier 142 receives both the error output by the first subtractor 130 and step size u. The step size u may be a constant, which is a preset value in the receiver. The first multiplier 142 is configured to generate an error increment by multiplying the error with the step U. The second multiplier 144 receives both the error increment from the first multiplier 142 and the second time-domain training sequence. The second multiplier 144 is configured to generate a channel estimation increment by multiplying the error increment with the second time-domain training sequence. The channel estimation update circuit 146 is coupled to the second multiplier 144. The channel estimation update circuit 146 comprises a group of registers and a group of adders. The set of registers is configured to store a channel estimation value for a previous moment. The channel estimation update circuit 146 receives channel estimation increment from the second multiplier 144, and the group of adders in the channel estimation update circuit 146 generates a current channel estimation value by adding the channel estimation increment to the channel estimation value for the previous moment. The arrow on the channel estimation update circuit 146 means that the channel estimation value is updated.

Alternatively, the updating circuit 140 is further configured to generate an updated channel estimation value by updating the current channel estimation value with the error using least mean squares (LMS) algorithm.

Alternatively, the updating circuit 140 is further configured to generate an updated channel estimation value by updating the current channel estimation value with the error using Recurrence Least Square (RLS) algorithm. The RLS algorithm has a better performance than LMS but has a larger amount of computation than the LMS algorithm.

The receiver 110 iteratively receives a next symbol of the first time-domain training sequence, the first convolution circuit 120, the first subtractor 130 and the updating circuit 140 repeat their respective operation using the updated channel estimation value until completion of receipt of a last symbol of the first time-domain training sequence. The error generated by the first subtractor 130 reflects the difference between the target channel estimation value and a current channel estimation value. The channel estimation value is converged using loop iteration discussed above. By updating the channel estimation value with the error, the updated current channel estimation value is closer to the target channel estimation value. The convergence of the channel estimation value is achieved when noise or interference is lower than a threshold, for example, an average of error equals zero.

The updating circuit 140 outputs the current updated channel estimation value as a channel estimation result upon receipt of a last symbol of the first time-domain training sequence.

Note both the first time domain training sequence and the second time domain training sequence has a plurality of symbols. The channel convergence circuit 100 performs the channel estimation in iterations in a symbol-by-symbol manner. For example, the first time-domain training sequence includes 140 symbols. Each time the receiver 110 receives one symbol of the 140 symbols of the first time-domain training sequence, and the first subtractor 130, the first convolution circuit 120 and the updating circuit 140 performs their respective operation. During each iteration, the error generated by the first subtractor 130 is updated, while the second time-domain training sequence maintains unchanged. Therefore the channel estimation value is updated accordingly. The updated channel estimation value in turn is fed back to the first subtractor 130 in the form of the convolution result by convoluting the updated channel estimation value with the second time-domain training sequence. The channel estimation is completed when all 140 symbols in the first time-domain training sequence have been treated accordingly. Note the second time-domain training sequence remains unchanged during 140 iterations for channel estimation based on the 140 symbols of the first time-domain training sequence.

Alternatively, the channel convergence circuit 100 is used in a single carrier mode, and the channel convergence circuit 100 reuses a decision feedback equalizer (DFE). For example, the channel convergence circuit 100 may replace the system including the first subtractor 130, the first convolution circuit 120, the first and second multipliers 142 and 144 with a decision feedback equalizer.

Figure 2:
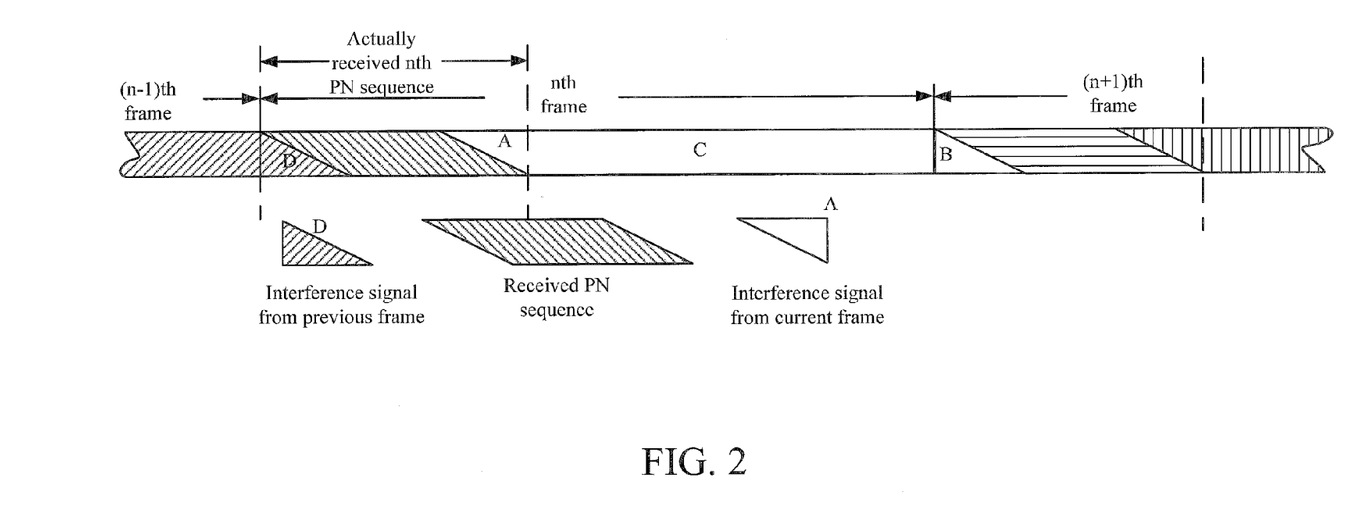
FIG. 2 a diagram illustrating a received signal of a channel estimator according to an embodiment of the invention.

FIG. 2 is a diagram illustrating a received signal of a channel estimator according to an embodiment of the invention. FIG. 2 shows a PN sequence, as an example of the time-domain training sequence. In FIG. 2, a (n−1)th frame, a nth frame, and a (n+1)th frame are shown. Due to the multi-path effect, actually received n-th PN signal (shown as a rectangle, and represented in arrows) that includes PN sequence of a n-th frame may include interference signal from previous frame, shown as the backslash triangle and marked as D, and interference signal from current frame, shown as the blank triangle and marked as A, and the received PN sequence, shown as the parallelogram shape.

Figure 3A:
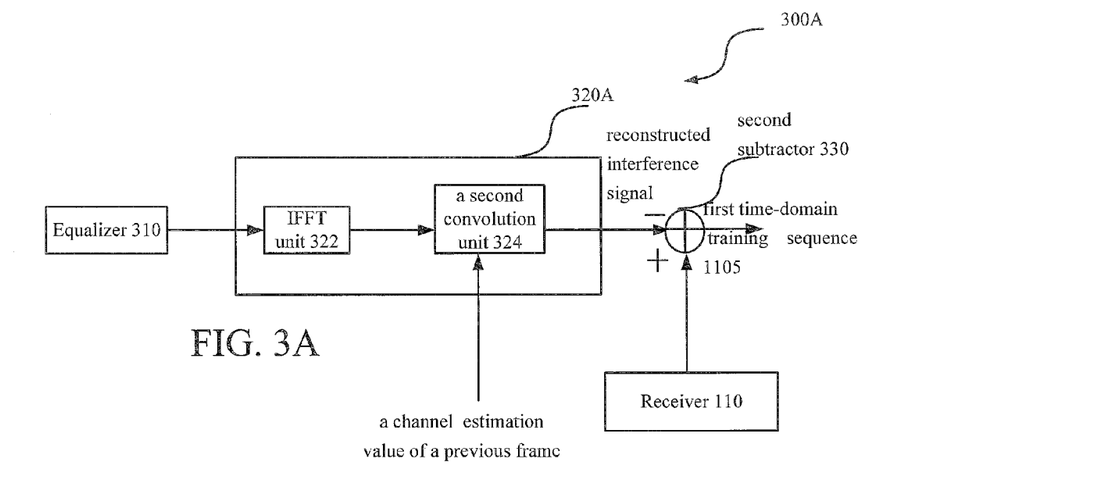
FIG. 3A is a diagram 300A illustrating a combination of the equalizer 310 and a signal re-constructor 320A in a channel estimator according to an embodiment of the invention.

FIG. 3A is a diagram illustrating a combination of the equalizer 310 and a signal re-constructor 320A in a channel estimator according to an embodiment of the invention. The channel estimator 300A further comprises an equalizer 310, a re-constructor 320A, and a second subtractor 330. The equalizer 310 generates a pre-equalized signal by pre-equalizing a received signal. The signal re-constructor 320A is coupled to the equalizer 310 and generates a reconstructed interference signal based on the pre-equalized signal. The second subtractor 330 is coupled to both the signal re-constructor 320A and the receiver 110, and the second subtractor 330 generates the first time-domain training sequence by subtracting the reconstructed interference signal from a received signal for a frame.

In FIG. 3A, the signal re-constructor 320A further comprises an IFFT circuit 322 and a second convolution circuit 324. The IFFT circuit 322 is configured to generate an IFFT result by performing IFFT calculation on the pre-equalized signal received from the equalizer 310. The second convolution circuit 324 is configured to generate the reconstructed interference signal by convoluting the IFFT result with the channel estimation value of the previous frame (which indicates that the channel estimation value belongs to the previous frame).

The part 300A of the channel estimator shown in FIG. 3A performs a time domain operation for generating reconstructed interference signal from the pre-equalized signal by first performing IFFT operation then perform convolution operation. Alternatively, the operation may be performed equivalently on the frequency domain instead of time domain.

Figure 3B:
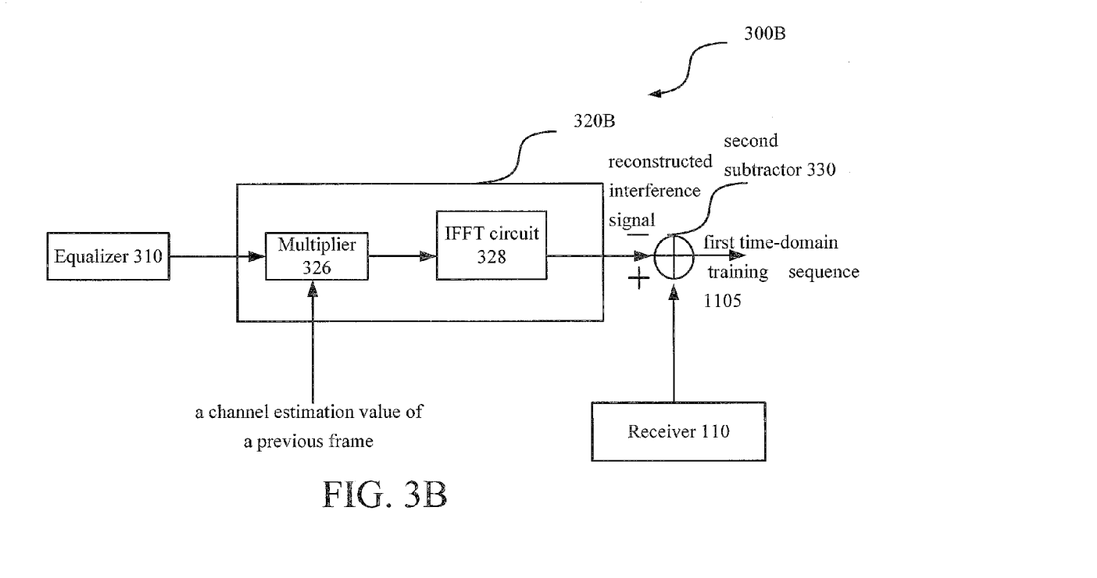
FIG. 3B is a diagram illustrating a combination of an equalizer 310 and a signal re-constructor in the channel estimator 300B with respect to according to an embodiment of the invention.

Accordingly, FIG. 3B is a diagram illustrating a combination of the equalizer 310 and a signal re-constructor 320B in a channel estimator according to an embodiment of the invention. The signal re-constructor 320B further comprises a multiplier 326 and an IFFT circuit 328. The multiplier 326 is configured to generate a multiplied signal by multiplying the pre-equalized signal with a channel estimation value of a previous frame. The IFFT circuit 328 is configured to generate the reconstructed interference signal by performing IFFT calculation on the multiplied signal.

Figure 3C:
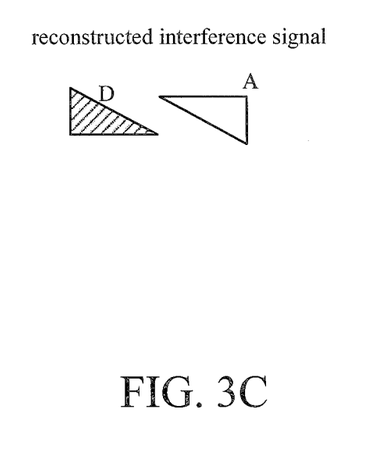
FIG. 3C is a diagram illustrating the reconstructed interference signal according to an embodiment of the invention.

FIG. 3C is a diagram illustrating the reconstructed interference signal according to an embodiment of the invention. As shown in FIG. 3C, the reconstructed interference signal includes two parts: the front part includes Part D of the n−1th frame (interference signal from previous frame, i.e., (n−1)th frame) and the rear part includes Part A of the n-th frame (Interference signal from current frame, i.e., nth frame).

Referring back to FIG. 2, for example, the second subtractor 330 generates the first time-domain training sequence by subtracting Part D of the n−1th frame (interference signal from previous frame) and Part A of the n-th frame (Interference signal from current frame) from the received signal (including part D, received PN sequence, and part A). As a result, the received PN sequence with interference cancelled (denoted as 1105) is generated. Note the sequence 1105 is only influenced by noise, while interference is cancelled from sequence 1105.

Figure 4:
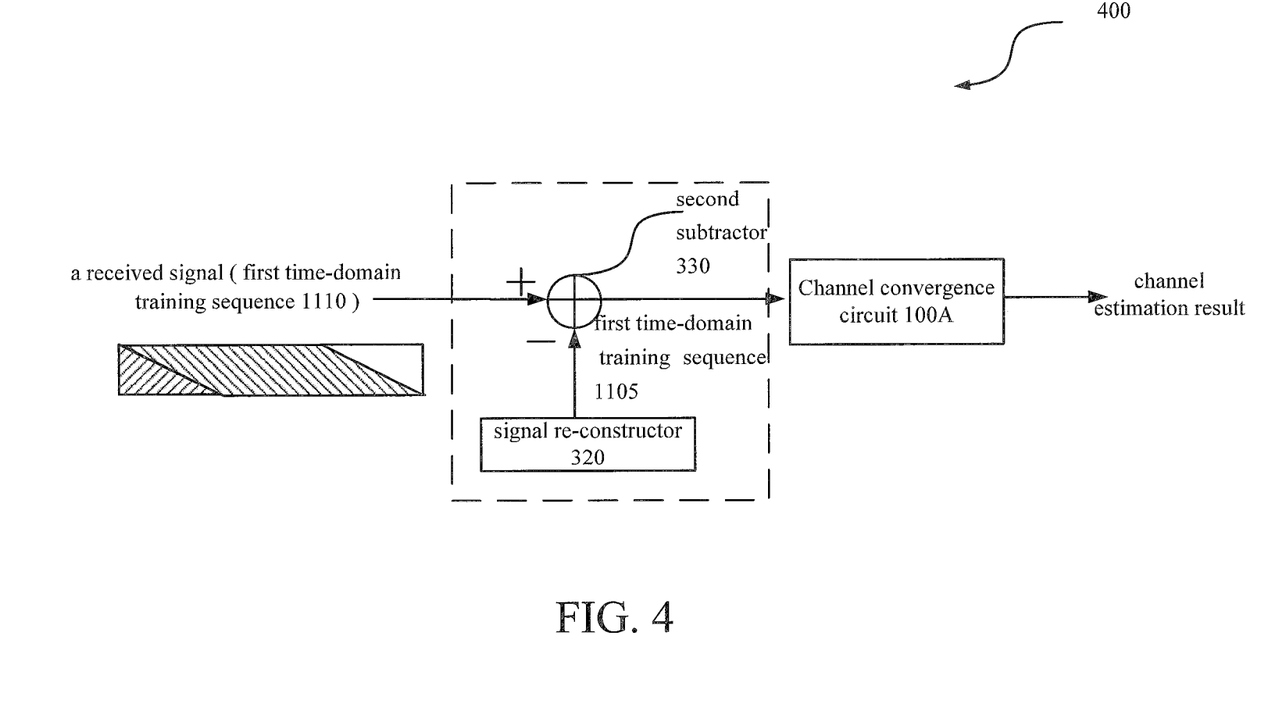
FIG. 4 is a diagram illustrating additional elements in the channel estimator according to an embodiment of the invention.

FIG. 4 is a diagram 400 illustrating additional elements with respect to the channel estimator according to an embodiment of the invention. As the second subtractor 330 and the signal re-constructor 320 have already been discussed with reference to FIG. 3A and FIG. 3B, they are not discussed here for simplicity. Note in an embodiment, the both the signal re-constructor 320 and the second subtractor 330 may be omitted, which are shown in the dashed block, therefore either the first time-domain training sequence 1110 or the first time-domain training sequence 1105 may act as the input of the receiver 110 as shown in FIG. 1. Further the channel convergence circuit 100A is similar to the channel convergence circuit 100 discussed with respect to FIG. 1, and the difference only lies in that the channel convergence circuit 100A in FIG. 4 does not include the receiver 110 shown in FIG. 1. Instead, the channel estimator 400 receives the received signal 1110 or 1105 directly.

Figure 5:
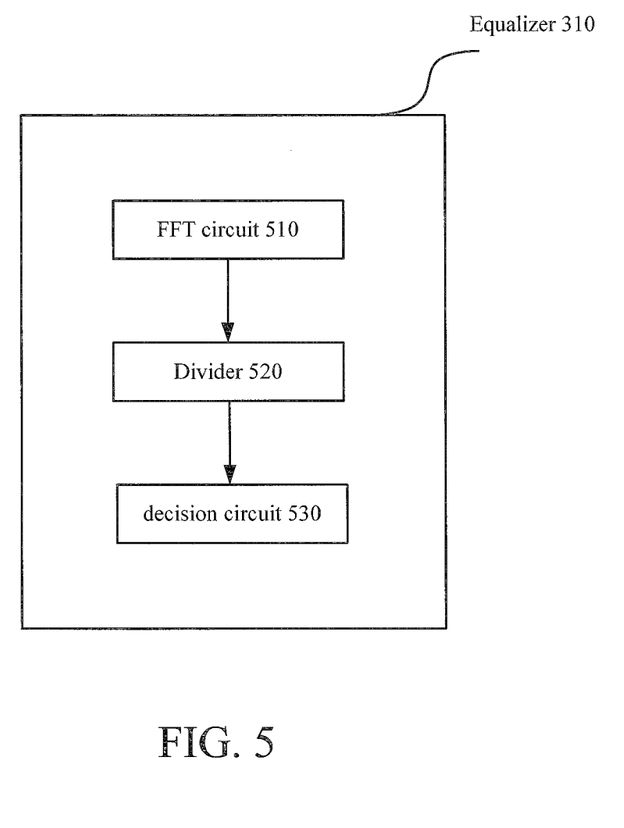
FIG. 5 is a block diagram illustrating the structure of the equalizer according to an embodiment of the invention.

FIG. 5 is a block diagram illustrating the structure of the equalizer 310 shown in FIG. 3A and FIG. 3B. As shown in FIG. 5, the equalizer 310 further comprises a FFT circuit 510, a divider 520, and a decision circuit 530. The FFT circuit 510 is configured to generate a FFT result by performing FFT calculation on the received signal. The divider 520 is coupled to the FFT circuit 510 and is configured to generate a quotient by dividing the FFT result by a channel estimation value of a previous frame. The decision circuit 530, coupled to the divider 520 and is configured to retrieve a transmitting signal based on the quotient.

Embodiments of the invention achieve the advantage of being independent of frame header structures and independent of maximum delays. In other words, embodiments of the invention are applicable to all frame header structures and various maximum delays. Further, the pretreatment of the received signal can improve the accuracy of channel estimation, for example, by interference cancellation and using iteration. Further, embodiments of the invention may be applicable to reuse DFE for a single carrier mode defined in DTMB.

Figure 6:
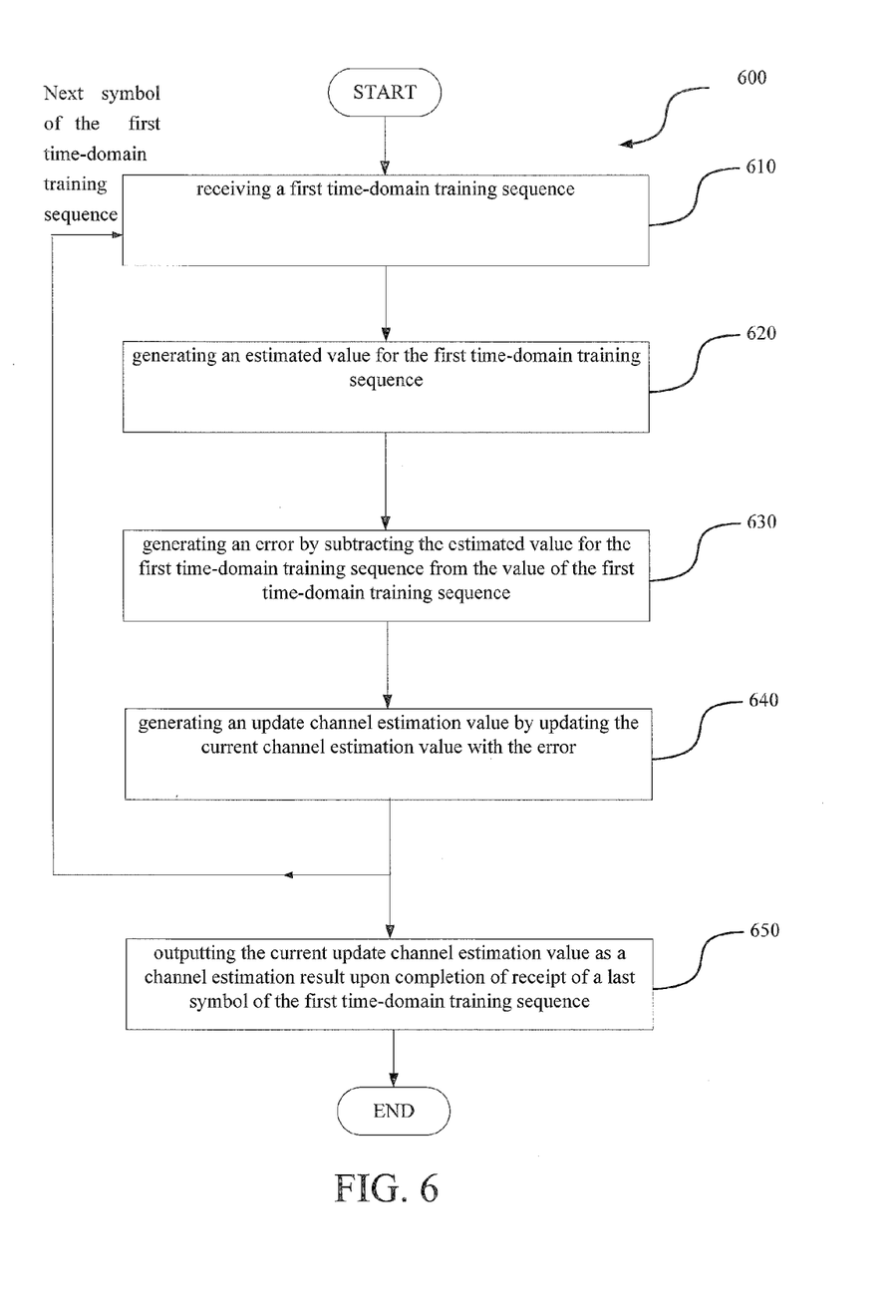
FIG. 6 is a flow chart illustrating a method of performing channel estimation according to an embodiment of the invention.

FIG. 6 is a flow chart illustrating a method 600 of performing channel estimation according to an embodiment of the invention. The method 600 of channel estimation, comprises receiving, in block 610 at a receiver, a first time-domain training sequence; generating, in block 620, an estimated value for the first time-domain training sequence by convoluting a second time-domain training sequence with a current channel estimation value, wherein the second time-domain training sequence represents a time-domain training sequence generated by the receiver; generating, in block 630, an error by subtracting the estimated value for the first time-domain training sequence from a value of the first time-domain training sequence; generating, in block 640, an updated channel estimation value by updating the current channel estimation value with the error; and iteratively receiving a next symbol of the first time-domain training sequence, generating an estimated value for an updated first time-domain training sequence, generating an updated error, and generating an update of the updated channel estimation value, until completion of receipt of a last symbol of the first time-domain training sequence, and outputting, in block 650, the current updated channel estimation value as a channel estimation result upon completion of receipt of a last symbol of the first time-domain training sequence.

Alternatively, although not shown in the drawings, the method 600 further comprises generating a pre-equalized signal by pre-equalizing a received signal; generating a reconstructed interference signal based on the pre-equalized signal; and generating the first time-domain training sequence by subtracting the reconstructed interference signal from a received signal for a frame.

Alternatively, although not shown in the drawings, generating a pre-equalized signal by pre-equalizing a received signal is implemented by generating a FFT result by performing FFT calculation on the received signal; generating a quotient by dividing the FFT result by a channel estimation value of a previous frame; and retrieving a transmitting signal based on the quotient.

Alternatively, although not shown in the drawings, generating a reconstructed interference signal is implemented by: generating an IFFT result by performing IFFT calculation on the pre-equalized signal; and generating the reconstructed interference signal by convoluting the IFFT result with a channel estimation value of a previous frame.

Alternatively, although not shown in the drawings, generating a reconstructed interference signal is implemented by: generating a multiplied signal by multiplying the pre-equalized signal with a channel estimation value of a previous frame; and generating the reconstructed interference signal by performing IFFT calculation on the multiplied signal.

Alternatively, although not shown in the drawings, generating an updated channel estimation value by updating the current channel estimation value with the error is implemented by generating an updated channel estimation value by updating the current channel estimation value with the error using least mean squares algorithm.

Figure 7:
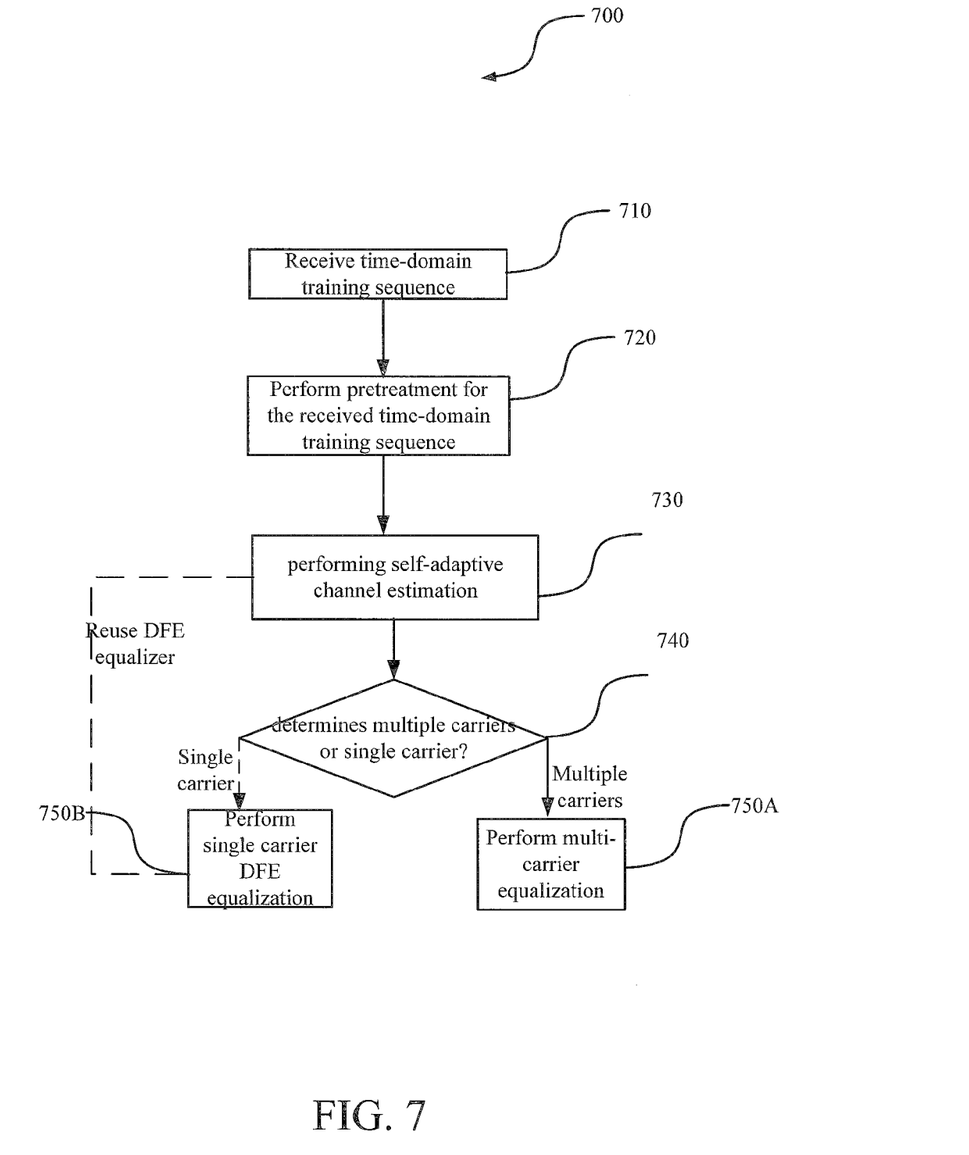
FIG. 7 is a flow chart illustrating a method of performing channel estimation according to another embodiment of the invention.

FIG. 7 is a flow chart illustrating a method 700 of performing channel estimation according to another embodiment of the invention. The method 700 comprises receiving in block 710, time-domain training sequence. The time-domain training sequence is obtained from an input signal using frame synchronization. Due to the multipath effect, the time-domain training sequence is subject to the interference from its previous frame and next frame. Then, in block 720, the method 700 further comprises performing pretreatment for the received time-domain training sequence. The pretreatment can be performed for example as shown with reference to FIG. 4. Then, in block 730, the method 700 further comprises performing adaptive channel estimation, for example, using LMS algorithm. Alternatively, the method 700 may use RLS algorithm instead of LMS algorithm for performing adaptive channel estimation in block 730. Then in block 740, the method further comprises determines whether the transmission system comprises multiple carriers or single carrier. Note the transmitter will transmit system information to the receiver. The system information may comprise whether the transmission system comprises single carrier or multiple carrier, the code rate, etc. Further, the receiver will detect the system information from the transmitter. If the transmission system comprises multiple carriers, then in block 750A, the method performs multi-carrier equalization. If the transmission system comprises single carrier, then in block 750B, the method performs single carrier equalization. The system may reuse DFE (decision feedback equalizer) for both the adaptive channel estimation in block 730 and the single carrier equalization in block 740B.

Another embodiment of the invention discloses a demodulator comprising the above discussed channel estimator.

Embodiments of the invention may further have the following advantages:

1. Uniformly use LMS algorithm for channel estimations for all channels with different frame header structure and different channel delays, which is a unified method;

2. Cancel the impact of data interference on the channel estimator via equalizer, which, in some embodiments, are more precise and accurate.

3. In single carrier mode, single-carrier DFE may be reused so as to reduce the chip areas for demodulators.

Note although embodiments of the invention use DTMB system as examples, embodiments of the invention may be applicable to any system that use time-domain training sequences.

Features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made without deviating from the spirit and scope of the present invention. Moreover, features of one embodiment may be incorporated into other embodiments, even where those features are not described together in a single embodiment within the present document. Accordingly, the invention is described by the appended claims.

I claim:

1. A channel estimator, comprising:
   a receiver, configured to receive a symbol of a first time-domain training sequence;
   a first convolution circuit, configured to generate an estimated value for the first time-domain training sequence by convoluting a second time-domain training sequence with a current channel estimation value, wherein the second time-domain training sequence represents a time-domain training sequence generated by the receiver;
   a first subtractor coupled to both the receiver and the first convolution circuit, and configured to generate an error by subtracting the estimated value for the first time-domain training sequence from a value of the first time-domain training sequence;
   an updating circuit coupled to both the first subtractor and the first convolution circuit and configured to generate an updated channel estimation value by updating the current channel estimation value with the error, and sending the updated channel estimation value to the first convolution circuit; wherein
   the receiver iteratively receives a next symbol of the first time-domain training sequence, the first convolution circuit, the first subtractor and the updating circuit repeat their operation using the updated channel estimation value until completion of receipt of a last symbol of the first time-domain training sequence,
   and the updating circuit is configured to output the current updated channel estimation value as a channel estimation result upon receipt of a last symbol of the first time-domain training sequence.

2. The channel estimator of claim 1, further comprising an equalizer configured to generate a pre-equalized signal by pre-equalizing a received signal;

a signal re-constructor coupled to the equalizer and configured to generate a reconstructed interference signal based on the pre-equalized signal;

a second subtractor coupled to both the signal re-constructor and the receiver and configured to generate the first time-domain training sequence by subtracting the reconstructed interference signal from a received signal for a frame.

3. The channel estimator of claim 2, wherein the equalizer further comprises a FFT circuit, configured to generate a FFT result by performing FFT calculation on the received signal;

a divider coupled to the FFT circuit and configured to generate a quotient by dividing the FFT result by a channel estimation value of a previous frame; and a decision circuit, coupled to the divider and configured to retrieve a transmitting signal based on the quotient.

4. The channel estimator of claim 2, wherein the signal re-constructor further comprises an IFFT circuit configured to generate an IFFT result by performing IFFT calculation on the pre-equalized signal; and a second convolution circuit, configured to generate the reconstructed interference signal by convoluting the IFFT result with a channel estimation value of a previous frame.

5. The channel estimator of claim 2, wherein the signal re-constructor further comprises a multiplier, configured to generate a multiplied signal by multiplying the pre-equalized signal with a channel estimation value of a previous frame; and an IFFT circuit configured to generate the reconstructed interference signal by performing IFFT calculation on the multiplied signal.

6. The channel estimator of claim 1, wherein the updating circuit is further configured to generate an updated channel estimation value by updating the current channel estimation value with the error using least mean squares algorithm.

7. The channel estimator of claim 1, wherein the channel estimator is used in a single carrier mode, and the channel estimator reuses a decision feedback equalizer.

8. A demodulator comprising the channel estimator according claim 1.

9. A method of channel estimation, comprising:

receiving, at a receiver, a first time-domain training sequence;

generating an estimated value for the first time-domain training sequence by convoluting a second time-domain training sequence with a current channel estimation value, wherein the second time-domain training sequence represents a time-domain training sequence generated by the receiver;

generating an error by subtracting the estimated value for the first time-domain training sequence from a value of the first time-domain training sequence;

generating an updated channel estimation value by updating the current channel estimation value with the error; and iteratively receiving a next symbol of the first time-domain training sequence, generating an estimated value for an updated first time-domain training sequence, generating an updated error, and generating an update of the updated channel estimation value, until completion of receipt of a last symbol of the first time-domain training sequence, and outputting the current updated channel estimation value as a channel estimation result upon completion of receipt of a last symbol of the first time-domain training sequence.

10. The method of claim 9, further comprising generating a pre-equalized signal by pre-equalizing a received signal;

generating a reconstructed interference signal based on the pre-equalized signal; and generating the first time-domain training sequence by subtracting the reconstructed interference signal from a received signal for a frame.

11. The method of claim 10, wherein generating a pre-equalized signal by pre-equalizing a received signal is implemented by generating a FFT result by performing FFT calculation on the received signal;

generating a quotient by dividing the FFT result by a channel estimation value of a previous frame; and retrieving a transmitting signal based on the quotient.

12. The method of claim 10, wherein generating a reconstructed interference signal is implemented by:

generating an IFFT result by performing IFFT calculation on the pre-equalized signal; and generating the reconstructed interference signal by convoluting the IFFT result with a channel estimation value of a previous frame.

13. The method of claim 10, wherein generating a reconstructed interference signal is implemented by:

generating a multiplied signal by multiplying the pre-equalized signal with a channel estimation value of a previous frame; and generating the reconstructed interference signal by performing IFFT calculation on the multiplied signal.

14. The method of claim 9, wherein generating an updated channel estimation value by updating the current channel estimation value with the error is implemented by generating an updated channel estimation value by updating the current channel estimation value with the error using least mean squares algorithm.

\* \* \* \* \*